United States Patent

Byron

Patent Number: 5,740,290
Date of Patent: Apr. 14, 1998

[54] OPTICAL FILTERING

[75] Inventor: Kevin Christopher Byron, Bishop's Stortford, United Kingdom

[73] Assignee: Northern Telecom Limited, Montreal, Canada

[21] Appl. No.: 800,261

[22] Filed: Feb. 13, 1997

Related U.S. Application Data

[62] Division of Ser. No. 594,471, Jan. 31, 1996, Pat. No. 5,647,037.

[30] Foreign Application Priority Data

Feb. 1, 1995 [GB] United Kingdom ............. 9501973

[51] Int. Cl.$^6$ .................. G02B 6/26; G02B 6/42
[52] U.S. Cl. .................. 385/27; 385/37
[58] Field of Search ............. 385/18, 22, 25, 385/37, 130, 131, 129, 147

[56] References Cited

U.S. PATENT DOCUMENTS

| | | | |
|---|---|---|---|
| 4,155,056 | 5/1979 | Cross et al. | 385/130 |
| 4,676,642 | 6/1987 | French | 356/346 |
| 4,722,604 | 2/1988 | French | 356/345 |
| 4,900,119 | 2/1990 | Hill et al. | 385/27 |
| 5,048,909 | 9/1991 | Henry | 385/27 |
| 5,151,585 | 9/1992 | Siebert | 385/27 |
| 5,195,161 | 3/1993 | Adar et al. | 385/129 |
| 5,305,402 | 4/1994 | Hill et al. | 385/18 |

*Primary Examiner*—Akm E. Ullah
*Attorney, Agent, or Firm*—Lee, Mann, Smith, McWilliams, Sweeney & Ohlson

[57] ABSTRACT

An optical wave, guide transmission filter has a 3 dB single mode waveguide coupler that is provided on one side of its coupling region with a spectrally matched pair of retro-reflecting optical waveguide Bragg grating reflectors. The optical path distance of one of the Bragg reflectors from the coupling region is greater than the equivalent distance of the other Bragg reflector by an amount greater than half the coherence length of a signal having a spectral width matched with that of the Bragg reflectors.

4 Claims, 1 Drawing Sheet

OPTICAL FILTERING

This application is a division of U.S. patent application Ser. No. 08/594,471 filed Jan. 31, 1996, now U.S. Pat. No. 5,647,037.

BACKGROUND OF THE INVENTION

This invention relates to the optical filtering of an optical signal contaminated by noise, and in particular to the filtering of such a signal having a spectral bandwidth significantly smaller than the spectral bandwidth of a channel within which that signal is constrained to lie.

Such a situation is liable to occur for instance in a wavelength division multiplexed (WDM) system. In such a system the spectral width of an individual channel is much wider than the actual spectral width of the signal that is being transmitted on that channel. This is a consequence of there being a tolerance upon the specified emission wavelength of optical sources, typically semiconductor lasers, employed for transmission of the signal traffic. These specified tolerances have to make allowance for such factors as ageing and the effects of temperature. In the case of a typical 10 Gbit/s WDM system, the signal bandwidth is 0.08 nm, while the channel bandwidth is a few nm. Although the signal itself may have a bandwidth of only 0.08 nm, it will normally be accompanied by broader bandwidth noise. Such noise may emanate from spontaneous emission from a laser source and, in the case of a system including optical amplifiers, from spontaneous emission from the amplifiers. For multiplexing or demultiplexing purposes, a transmission filter will normally be required to have a bandwidth equal to the channel bandwidth, in this instance typically 2 nm wide. Any attempt to attempt to attenuate the noise power extending over the spectral range of the channel will attenuate the signal by an equivalent amount, and so will provide no improvement of signal to noise ratio.

SUMMARY OF THE INVENTION

The present invention is directed to filtering that can provide an improvement in signal to noise ratio.

According to the present invention there is provided a method of filtering a noise contaminated optical signal the spectral width of which signal is small compared the spectral width of a channel within which the signal is constrained to lie, in which method the noise contaminated signal is divided into components which are caused to propagate different optical path distances before being recombined after reflection in, or transmission through, spectrally matched spectrally selective optical filter elements that are spectrally matched with the spectral width of the channel, wherein the difference in said optical path distances is great enough substantially to preclude coherent recombination of noise power extending over the spectral range of the filter elements while being small enough to provide substantially complete coherent recombination of the signal power.

The invention also provides an optical waveguide transmission filter having a 3 dB single mode optical waveguide coupler provided, on one side of its coupling region, with a spectrally matched pair of retro-reflecting optical waveguide Bragg grating reflectors, one on each of the two limbs of the 3 dB coupler, wherein the difference in optical path distance from the coupling region of the 3 dB coupler to each of the two Bragg reflectors is greater than half the coherence length of a signal having a spectral width matched with that of the Bragg reflectors.

BRIEF DESCRIPTION OF THE DRAWINGS

There follows a description of an optical filter embodying the invention in a preferred form. The description is prefaced with an explanation of the principles underlying the operation of the filter. The explanation and description refer to the accompanying drawings, in which.

DETAILED DESCRIPTION OF THE PREFERRED EMBODIMENT

Figure 1:
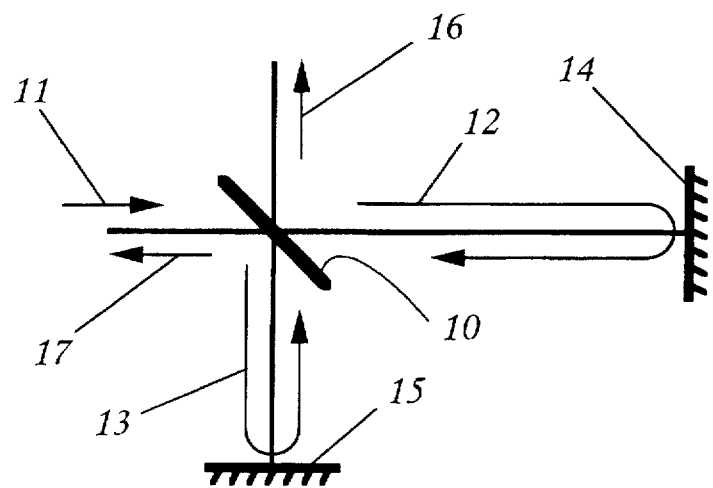
FIG. 1 is a schematic diagram of a Michelson interferometer.

Referring in the first instance to FIG. 1, the basic components of a Michelson interferometer comprise a 3 dB beam splitter 10 which divides an input beam 11 into two equal amplitude components 12 and 13. These two components are subsequently recombined by the same beam splitter 10 after each beam has been reflected in an associated reflector 14, 15. It will be observed that though the beam splitter 10 serves to combine the reflected components 12 and 13, it does not necessarily combine them into a single combined beam. Generally it forms two combined output beams 16 and 17 whose relative power levels depend upon the difference in optical path distance travelled by the two component beams 12 and 13 before they are recombined by the beam splitter 10. If this difference is greater than the coherence length of the input beam 11, then there is no optical interference between the two reflected component beams. Accordingly the power in each reflected component beam 12 and 13 is divided equally between output beams 16 and 17. If however the difference in optical path distance travelled by the two component beams 12 and 13 is significantly less than the coherence length of the input beam, then the division of the emergent power between output beams 16 and 17 is dominated by interference effects. In particular, if the difference is zero, or an integral number of wavelengths long, then the reflected component beams 12 and 13 will interfere with a phase relationship that causes substantially all the output power to emerge by way of output beam 16. If the value of the optical path distance is changed so as to alter the phase relationship by $\pi$, then substantially all the output power will emerge by way of output beam 17. For intermediate values the power will be shared between the two output beams in a proportion determined by the phase relationship.

In FIG. 1 the 3 dB beam splitter 10 has been represented as a discrete bulk optics component, but it can alternatively be constituted by an optical waveguide format component. The reflectors 14 and 15 may similarly be constituted by optical waveguide reflectors, such as retro-reflecting Bragg grating reflectors. The optical waveguide format 3 dB coupler and reflectors may be optical fibre waveguide components, or may form components of an integrated optics structure. Bragg grating reflectors are spectrally selective, and so the device of FIG. 1 constructed with an optical waveguide format 3 dB coupler 10 and Bragg grating reflectors 14 and 15 can be employed as a form of spectrally selective optical filter. Such an arrangement of 3 dB coupler and Bragg reflectors is for instance described in the specification of patent application Ser. No. 94308102.6, which relates to a construction that automatically ensures that the two gratings are optically equidistant from the coupling region of the 3 dB coupler. Such an arrangement is also described in a paper by F Bilodeau et al entitled 'High-Return-Loss Narrowband All-Fiber Bandpass Bragg Transmission Filter', IEEE Photonics Technology Letters, Vol. 6, No 1, pp 80–2, which relates to a construction that includes a trimmer for adjusting the optical path distance of one of the gratings from the coupling region so as to be able to provide the requisite phase relationship between the light reflected by that grating and the light reflected by the other grating when they interfere in the coupling region of the 3 dB coupler.

Such a filter with zero optical path distance difference from the coupling region to each of the Bragg grating reflectors can be used for selecting one of the channels of the WDM system to which previous reference has been made. This will require Bragg grating reflectors with spectral widths matched with that of the channel concerned but, as previously explained, any attenuation provided by this filter to reduce noise power extending evenly over this spectral band will attenuate signal power to the same extent, and thus will not achieve any signal to noise ratio improvement. However, with particular reference to FIG. 2, it will now be explained how such an improvement can be effected by modifying the filter design so as to incorporate a significant difference in optical path difference from the coupling region of the 3 dB coupler to each of the Bragg grating filters, specifically a difference greater than half the coherence length of a signal having a spectral width matched with that of the Bragg reflectors.

Figure 2:
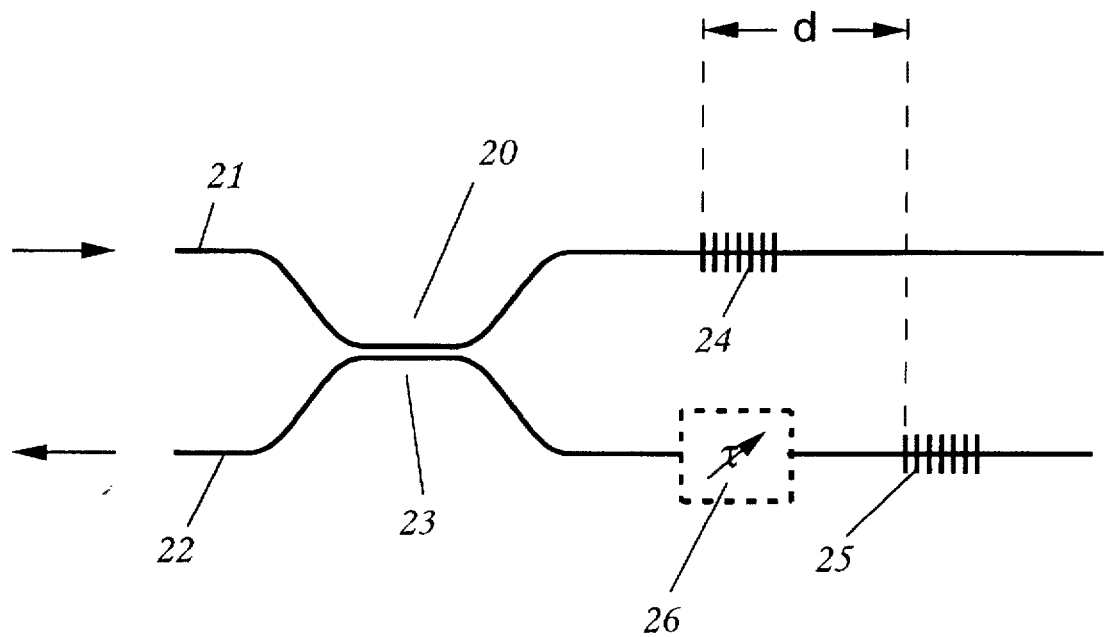
FIG. 2 is a schematic diagram of the preferred embodiment of filter.

Referring now to FIG. 2, an optical waveguide 3 dB coupler 20 has two single mode waveguide limbs 21 and 22 which are optically coupled in an optical coupling region 23. On one side of this coupling region there is a spectrally matched pair of retro-reflecting Bragg grating reflectors 24 and 25, one on each waveguide limb. The two Bragg reflectors are not equidistant from the coupling region 23: the difference in optical path distance (product of physical distance with effective refractive index) from the coupling region to each of the two Bragg reflectors is a value of 'd' units length. This value is greater than half the coherence length of a signal having a spectral width matching that of the Bragg reflectors.

The optical waveguide limbs may be constructed in integrated optics format or in optical fibre format. The Bragg gratings may be created in the waveguides by irradiation with a fringe pattern of relatively high intensity ultra-violet light. Such a fringe pattern can be provided by two-beam interference effects, for instance as described in U.S. Pat. No. 4,275,110. An alternative way of providing such a fringe pattern can be with the aid of a phase grating as for instance described in a paper by K O Hill et al entitled 'Bragg gratings fabricated in monomode photosensitive optical fiber by UV exposure through a phase mask', Appl. Phys Lett., Vol. 2, No. 10, pp 1035-7.

It is easily seen that, if the optical path distance difference 'd' were zero, then all the noise present within this 2 nm band will be transmitted by the filter along with the signal that has a bandwidth of only 0.08 nm. However, by making the optical path distance difference 'd' a non-zero value, the light reflected back into the coupling region 23 by Bragg reflector 25 will have had to travel a greater distance than that reflected by Bragg reflector 24, the difference in distance amounting to '2d'. Clearly, if the optical path distance difference 'd' is greater than half the coherence length of an optical transmission having a bandwidth of 2 nm, then '2d' is greater than the full coherence length. Accordingly, so far as the 2 nm bandwidth noise is concerned, the components reflected by the respective Bragg reflectors 24 and 25 do not interfere in the coupling region 23. Consequently only half of the power of this noise is transmitted by the filter, the balance being reflected by it. In contrast to this, the signal has a much longer coherence length on account of its much narrower bandwidth, and hence, provided that 'd' is not very much longer than the coherence length of the 2 nm wide optical transmission, there is almost complete overlap and therefore almost total interference between the two reflected portions of the 0.08 nm bandwidth signal. The division of the reflected signal power between the two limbs depends, as explained previously, upon the relative phase of the two reflected portions on their return passage through the coupling region. This relative phase is a function of the wavelengths of the signal and of the magnitude of the optical path distance difference 'd', and therefore either of these parameters can in principle be adjusted to provide the requisite relative phase for all the interfering light to be coupled by the filter from one limb of the 3 bB coupler into the other (i.e. for the filter to act as a transmission type filter). For the particular wavelength division multiplexed system application referred to above, the wavelength of the signal is variable over a range that will compass many cycles of relative phase angle, and so in this instance the adjustment necessary to ensure the requisite relative phase will normally be effected by way of adjustment of the optical path distance difference 'd' by means of a variable delay element 26 inserted in one of the limbs 21, 22 between the coupling region 23 of the 3 dB coupler 20 and the associated Bragg reflector 24, 25.

I claim:

1. A method of filtering a noise contaminated optical signal the spectral width of which signal is small compared with the spectral width of a channel within which the signal is constrained to lie, in which method the noise contaminated signal is divided into components which are caused to propagate different optical path distances before being recombined after reflection in, or transmission through, spectrally matched spectrally selective optical filter elements that are spectrally matched with the spectral width of the channel, wherein the difference in said optical path, distances is great enough substantially to preclude coherent recombination of noise power extending over the spectral range of the filter elements while being small enough to provide substantially complete coherent recombination of the signal power.

2. A method as claimed in claim 1, wherein the division of the noise contaminated signal is effected by means of a 3 dB optical waveguide coupler.

3. A method as claimed in claim 2, wherein the recombination of the noise contaminated signal is effected by means of a 3 dB optical waveguide coupler.

4. A method as claimed in claim 3, wherein the recombination is effected after reflection in Bragg grating spectrally selectively reflecting optical filter elements.

* * * * *